Feb. 13, 1968

G. A. WILSON 3,369,178

AUTOMOTIVE TACHOMETER ENERGIZED BY THE
IGNITION PRIMARY CIRCUIT

Filed Aug. 26, 1965

INVENTOR
GEORGE A. WILSON

BY Killman & Lamb

ATTORNEYS

INVENTOR
GEORGE A. WILSON

Feb. 13, 1968

G. A. WILSON 3,369,178

AUTOMOTIVE TACHOMETER ENERGIZED BY THE
IGNITION PRIMARY CIRCUIT

Filed Aug. 26, 1965

INVENTOR
GEORGE A. WILSON

BY *Killman & Lamb*
ATTORNEYS

United States Patent Office  3,369,178
Patented Feb. 13, 1968

3,369,178
AUTOMOTIVE TACHOMETER ENERGIZED BY
THE IGNITION PRIMARY CIRCUIT
George A. Wilson, Baltimore, Md., assignor to The
Bendix Corporation, Towson, Md., a corporation of
Delaware
Filed Aug. 26, 1965, Ser. No. 482,786
6 Claims. (Cl. 324—70)

The present invention relates to improvements in electrical circuits for internal combustion engine tachometers.

One object of the invention is to provide an engine tachometer which is relatively cheap to manufacture and which may be easily fitted to the engine. Since this is an object common to virutally every automotive accessory, present trends have been away from mechanical tachometers connected to the engine output and towards electrical tachometers which measure the rate of ignition pulses and hence, indirectly, the engine speed. However, the irregular waveform of ignition voltage or current pulses complicates the design of a seemingly simple current or voltage pulse counting circuit, if wide range linearity is to be preserved.

Another object of the invention is therefore to provide an electrical tachometer of improved linearity of response, particularly at high engine speeds, and thus simplify calibration procedures necessary during manufacture, as well as to provide more accurate engine speed indications.

Automobile tachometers are located for the convenience of the operator which generally means that the indicator and possibly all of its associated circuits are mounted in the automobile instrument panel. This places a very potent source of noise close to the automobile radio receiver. A further object of the invention is therefore to provide an electrical tachometer so connected in the ignition circuit and of such design as to reduce radio frequency interference to a minimum.

Other objects and advantages of the invention will become apparent as an understanding of its construction and operation is gained through study of the following description and the accompanying drawings.

Briefly the invention comprises a tachometer circuit to which an input signal is supplied from the primary ignition current. Means are provided for eliminating certain oscillations from the input signal and for shaping the signal to a square waveform. The square wave is then applied to a counter circuit which produces an average signal current proportional to the square wave frequency. A meter calibrated in terms of engine speed provides the output indication.

Figure 1:
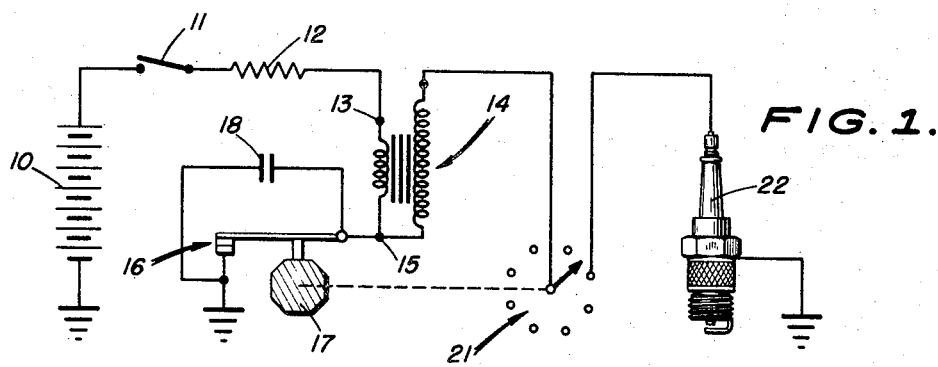
FIG. 1 is a schematic diagram of a conventional electrical ignition system.

FIG. 1 illustrates a conventional battery ignition system in which the invention is used. The primary ignition circuits is established from the positive pole of the battery 10, the negative pole of which is grounded, through the ignition switch 11 and ballast resistor 12 to one terminal 13 of the primary winding of spark coil 14. The other primary terminal 15 of the spark coil is connected to the breaker points 16 which are operated by the distributor cam 17. The breaker points, one of which is grounded, are shunted by a condenser 18, which forms a series resonant circuit with the spark coil primary upon the opening of the points.

The high voltage circuit of the system includes the secondary winding of the spark coil 14, the distributor rotor 21 and a spark plug 22 for each cylinder of the engine.

Figure 2:
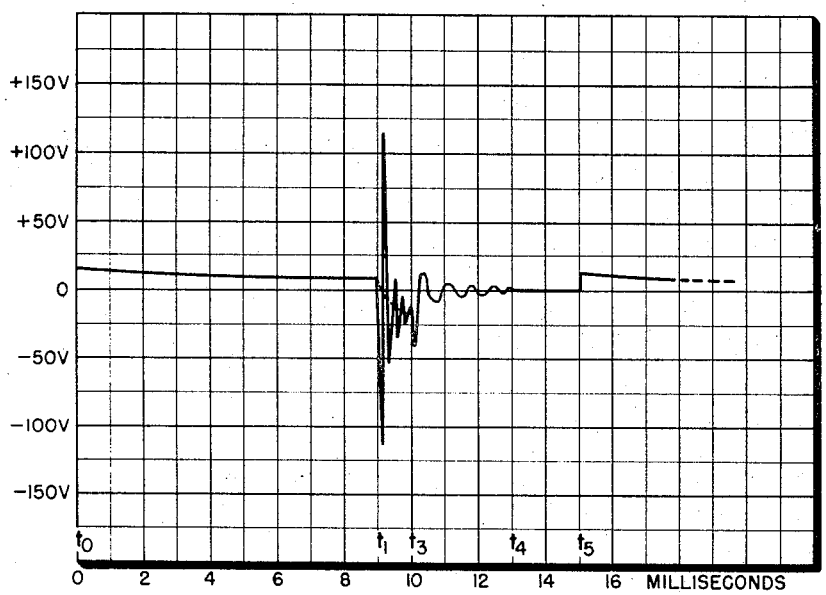
FIG. 2 is a waveform of the voltage in the primary circuit of the ignition system of FIG. 1.
Figure 2A:
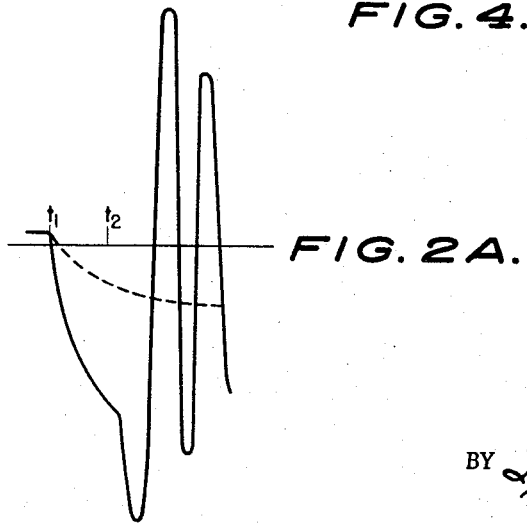
FIG. 2A is an enlarged portion of the waveform of FIG. 2.
Figure 3:
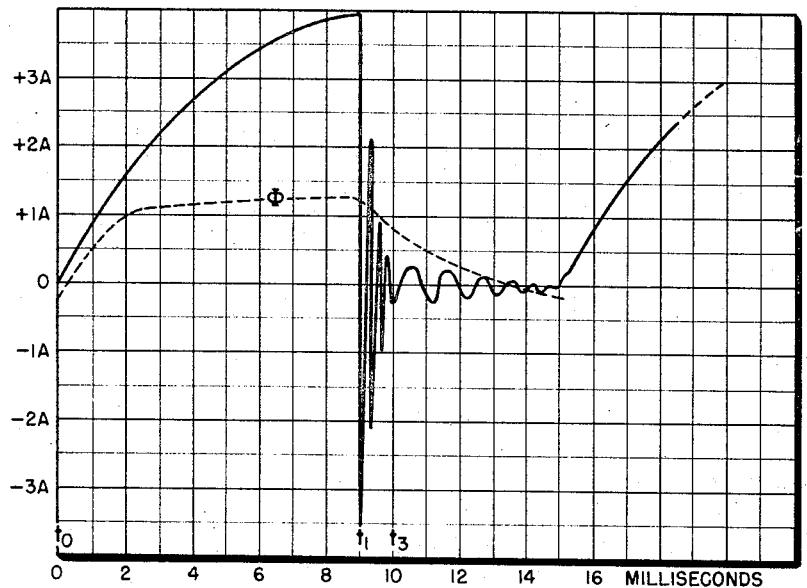
FIG. 3 is a waveform of the current in the primary circuit of the ignition system of FIG. 1.

Voltage and current waveforms for the primary of the ignition circuit are shown in FIGS. 2 and 3. Referring to FIG. 2, the voltage across the ignition coil primary at time $t_0$ is the battery voltage impressed by the closing of the breaker points. The voltage drops off during the period of point dwell due to increasing primary current and voltage drop in the ballast resistor. At time $t_1$ the breaker points open initiating a damped oscillation with a frequency of the order of 1 kcs and an initial amplitude of about 500 v. peak to peak. Referring to the expanded waveform of FIG. 2A, shortly after the commencement of oscillation, at time $t_2$, the secondary voltage of the coil will have risen to such value as to fire the spark plug. This effectively alters the primary circuit constants in such manner as to substantially increase the resonant frequency. Oscillation continues at the higher rate until at time $t_3$ insufficient secondary voltage is present to maintain the arc in the spark plug. A second transient is then noticed as the oscillation returns to the frequency determined by the circuit constants with no load in the secondary of the coil. The second transient appears to be related to the decay of the average value of the higher frequency oscillations occurring upon extinguishment of the spark. This average value is shown as the dashed line in FIG. 2A. Finally, at time $t_4$ the primary oscillations cease and the cycle begins again with the closing of the breaker points at time $t_5$. Higher engine speeds result in compression of the time base, shortening the period ($t_0$–$t_5$) and proportionately reducing the intervals ($t_0$–$t_1$) and ($t_1$–$t_5$) to a point where the breakers may close while the primary voltage is still at a considerable level of oscillation. In such case, the initial portion of the waveforms will differ from the illustrations.

Aside from mechanical factors, there are several practical limits encountered in ignition system design. It has become apparent that the peak current through the breaker points must be limited to about 5 a., which occurs during cranking and idling. Choice of the primary inductance to provide adequate stored energy for each spark is then a compromise related to the resistance required to limit the current to 5 a. and the performance at high speeds, where the charging current attainable is a function of the time constant of the circuit, i.e., the ratio of inductance to resistance. In the mid 50's, engine speeds had out paced the 6 v. ignition system, so a general change was made to a 12 v. system to permit a reduction of peak current values and a reduction of charging time constant. Since this embraced some engines of moderate speed capabilities, a considerable variety of designs of primary circuits ensued, whereby one engine might still employ a range of 3 a. to 5 a., while another might use a range of 2 a. to 2¾ a. And in a system using solid state devices, the peak coil current may be as high as 10 a., while the peak breaker point current will be less than 1 a. The minimum value occurs at maximum engine speed in any case, where some further fluctuation about the design value will occur traceable to the fact that the breaker points close on a current which may be of significant magnitude, and will vary in both magnitude and polarity with small changes in engine speed.

Figure 4:
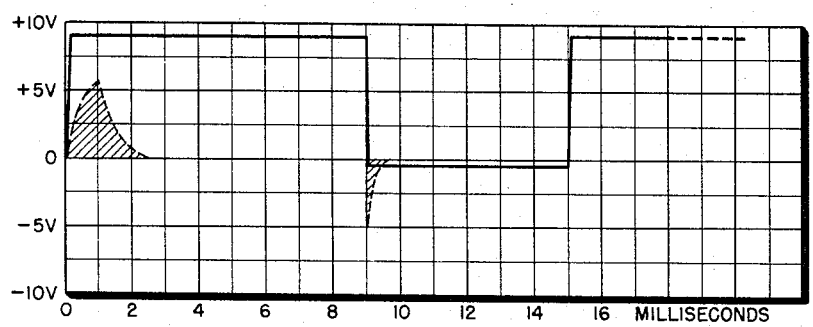
FIG. 4 is a waveform of the voltage in a prior art tachometer circuit.

A common object of prior art tachometer circuits, and indeed of the present invention, is to reduce the complex waveform of FIG. 2 to the square waveform of FIG. 4, whence simple counting circuits may be used to indicate the frequency of the wave, which is analogous to engine speed.

Figure 5:
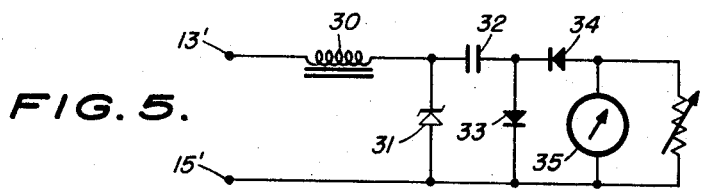
FIG. 5 is a schematic diagram of a prior art tachometer circuit.

A favored prior art circuit appears in FIG. 5 which comprises a choke 30 and zener diode 31 connected with input terminals 13' and 15', respectively, connected to the terminals 13 and 15 of the ignition coil primary. The choke 30 is intended to present a high impedance to oscillations of the primary voltage, smoothing the same nearly to their average value. The zener diode is poled for avalanche breakdown during application of the battery voltage when the breakers are closed. Diode 31 conducts in the forward direction when the breakers open. Thus, ideally, the square wave of FIG. 4 appears across diode 31. One lead of a differentiating capacitor 32 is connected to the cathode of diode 31 with the other lead connected to oppositely poled diodes 33 and 34. Diode 33 conducts in the forward direction for positive polarity outputs from capacitor 32, while diode 34 conducts in the forward direction through an output meter 35 for negative outputs from capacitor 32. Two unlike differentiating networks are thus effectively formed. For positive outputs from capacitor 32 the network appears as a short time constant, low impedance circuit consisting of the capacitor 32 and the forward resistance of diode 33. For negative outputs from capacitor 32, the network appears to be a longer time constant, higher impedance circuit consisting of capacitor 32, the forward resistance of diode 34 and the resistance of meter 35. The waveform of the currents through these effectively different networks is shown cross-hatched in FIG. 4. Ideally, therefore, the average current indicated by the meter is directly proportional to the frequency of the square wave from diode 31. In practice, however, the circuit of FIG. 5 departs from the ideal. It is evident that the choke must have a low pass filter characteristic to block the oscillation frequencies and yet pass enough current at the breaker frequency to operate the zener diode 31 and the counter circuit effectively. Where the maximum breaker frequency may be above 400 c.p.s., as in a modern eight cylinder engine, the breaker current frequencies may extend into the attenuation band of the filter, thus rendering the circuit inaccurate at high speed.

Figure 6:
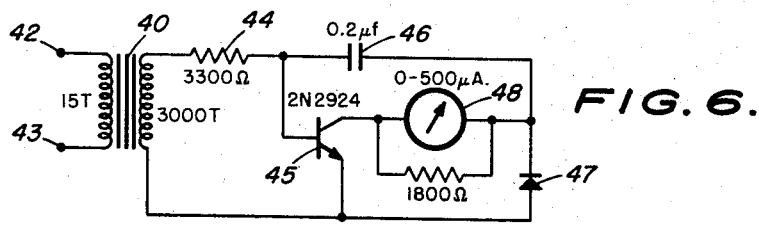
FIG. 6 is a schematic diagram of the tachometer circuit of the present invention.

FIG. 6 illustrates one embodiment of the present invention. An input transformer 40 is connected with the primary terminals 42 and 43 connected in series with the primary ignition circuit. For most installations it will be found convenient to open the primary ignition circuit at the ignition switch 11 and insert terminals 42 and 43 in series with the switch 11 and balast resistor 12. The transformer 40 is designed and loaded for saturation early during the dwell of the breaker points, as will be more fully described later. The secondary circuit of transformer 40 includes a current limiting resistor 44 and a transistor 45 connected with the base-emitter junction to complete the circuit. As will later appear, transistor 45 conducts in the forward direction for positive potentials applied to its base and conducts by avalanche breakdown for negative base potentials. A differentiating capacitor 46 is connected to the junction of resistor 44 and the base of transistor 45 and returned to the emitter of transistor 45 through a diode 47 which is poled oppositely to the emitter. A meter 48 is connected between the collector of transistor 45 and the junction of capacitor 46 and diode 47. The base-collector junction of transistor 45 functions similarly to diode 34 in the circuit of FIG. 5.

Successful operation of the circuit of FIG. 6 depends upon the characteristics of the transformer 40. The transformer primary may comprise six to twenty turns and the turns ratio of the secondary winding may be between 100 and 500. An open circuit secondary potential of several hundred volts would thus be induced. A low voltage zener diode connected directly across the secondary would amount to a virtual short circuit and thus prevent the desired saturation of the core. The value of resistor 44 is selected to limit the secondary current to a value which insures saturation of the core at the time of breaker point opening, for the reasons now to be discussed.

Figure 7:
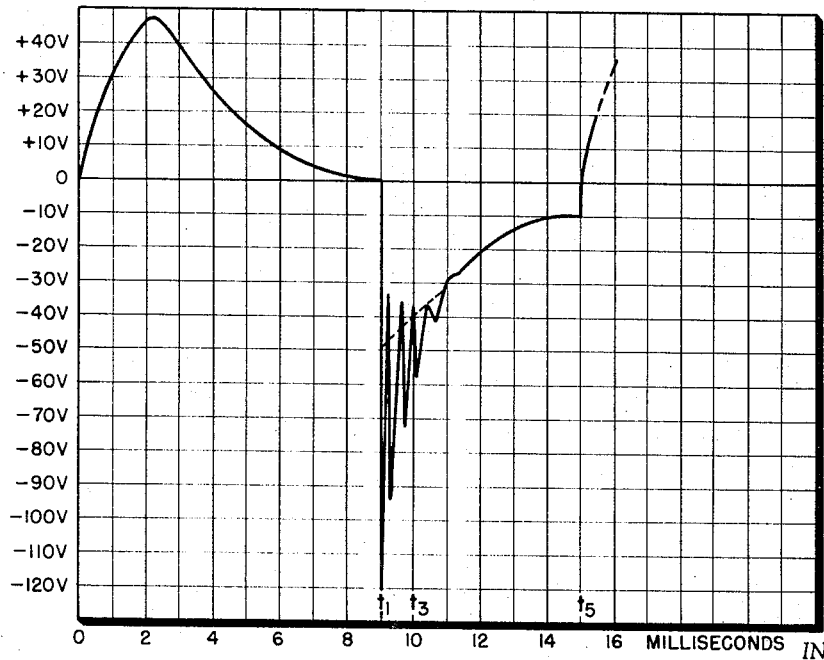
FIG. 7 is a waveform of the voltage in the tachometer circuit of the invention.

Referring to the waveform of primary ignition current in FIG. 3 and the voltage waveform for the secondary of transformer 40 in FIG. 7, it will be seen that during the closed-point interval ($t_0$–$t_1$) the current is unidirectional and of a shape which would permit the ready determination of frequency by a simple counter circuit. However, the spark interval ($t_1$–$t_3$) is marked by several high frequency oscillations which would render counter circuits inaccurate. The transformer 40 is designed to saturate at a primary current of about 1.5 a. The transformer secondary voltage therefore rises to a peak value at the time of core saturation and thereafter decreases to zero level at time $t_1$. The transformer flux is plotted in FIG. 3. When the breaker points open at time $t_1$, the transformer flux is at a peak value which cannot be immediately reversed by the negative-going oscillation current due to the transformer core hysteresis. The average value of transformer flux therefore follows the dashed line towards zero and a negative transient having a substantial D.C. component is produced in the secondary voltage waveform. The D.C. component of the transient follows the dashed line of FIG. 7 during the interval ($t_1$–$t_3$) and thereafter the solid line, decreasing to a final value of about $-10$ v. The beneficial effect of the transient is to depress even the most positive peaks of all secondary voltage oscillations occurring during the interval ($t_1$–$t_3$) below the $-10$ v. level. Consequently, a zener diode having a breakdown potential of about $-9$ v. will shape the waveform of FIG. 7 into a well defined square wave having a value of about $-9$ v. throughout the interval ($t_1$–$t_5$).

The circuit of FIG. 6 advantageously replaces the conjectured zener diode with an NPN transistor which, during the interval ($t_0$–$t_1$) is forward biased by the positive voltage from the secondary of transformer 40. The voltage across the base-emitter junction is then at a low value so that capacitor 46 charges a negligible amount. During the interval ($t_1$–$t_5$) the base-emitter junction is reverse biased an amount in excess of the breakdown potential of the junction. Consequently the voltage applied to capacitor 46 is constant at the breakdown potential and the capacitor charges through the low resistance path afforded by diode 47. The base-collector junction is reverse biased during this interval so no charging current flows through the meter 48. When the base-emitter junction is forwardly biased during the next interval corresponding to ($t_0$–$t_1$) the collector current saturates with the capacitor discharging through the meter 48. The meter thus measures the average charging current of capacitor 46 in a manner similar to the counter circuit of FIG. 5, but with the advantage that the saturated collector junction possesses a lower apparent resistance than a diode.

Figure 8:
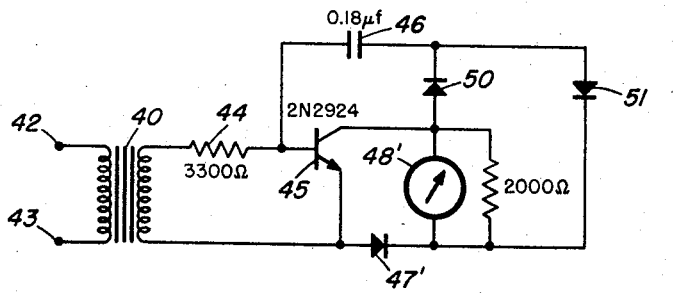
FIG. 8 is a schematic diagram of a modification of the tachometer circuit of the invention.

The modification of FIG. 8 provides full wave rectification of current flow through the differentiating capacitor and thus permits use of a less sensitive meter. In the circuit of FIG. 6, a 500 μa. meter is used. In the circuit of FIG. 8 a 1 ma. meter may be used satisfactorily even for four cylinder engines. The input transformer 40 and transistor 45 are the same as in FIG. 6, with the transformer operating in the same manner to produce the waveform of FIG. 7. Diodes 50 and 51 are additional. Diode 50 is connected from the collector of transistor 45 to a capacitor 46 and poled for conduction of current passing through diode 47'. Diode 51 is connected with opposite polarity between the cathode of diode 50 and the junction of the cathode of diode 47 and the meter 48'. The arrangement of the circuit provides that both the charging and discharging current of capacitor 46 flow unidirectionally through the meter. When the base of transistor 45 is positive, the collector and emitter are conductively biased. Current flow is from the capacitor 46 through diode 51 and the meter 48' to the collector of transistor 45. When the base of transistor 45 is negative, current flow is through diode 47', the meter 48' and diode 50 to capacitor 46. Current flowing in the latter direction is considered to charge the capacitor, since it is during this portion of the cycle that constant voltage of substantial value is applied to the capacitor. With both the charging and discharging current of the capacitor 46 flowing through the meter, the measured current at a given engine speed is twice as great in the embodiment of FIG. 8 as in the embodiment of FIG. 6 so that the meter sensitivity may be lowered for the second embodiment while the meter deflection remains the same. The lower cost of the less sensitive meter offsets the cost of the additional diodes required and further advantage may be found in the more rugged movements generally used in the less sensitive meters.

The invention in its several embodiments has been described with reference to an ignition system in which the negative pole of the battery is grounded. Obviously the invention may be adapted to positive ground systems by simply inverting the connections to the primary of the input transformer. Other variations are also possible without departing from the spirit of the invention. The invention should therefore be regarded as limited solely by the scope of the appended claims.

The invention claimed is:
1. A tachometer circuit for internal combustion engines with electrical spark ignition systems having an induction coil and breaker points driven synchronously by the engine for interrupting primary current to the coil, comprising,
   an input transformer with stepup turns ratio between the primary and secondary windings thereof, the primary winding of said transformer being connected in series with the primary circuit of the ignition system coil;
   a load resistor connected to the secondary winding of said transformer;
   a transistor having base, emitter and collector electrodes, sand base and emitter electrodes being in series circuit with said load resistor across said transformer secondary winding;
   a diode having one electrode thereof connected to the emitter of said transistor;
   a meter connected to the other electrode of said diode and to the collector of said transistor; and
   a capacitor connected between the base of said transistor and said other electrode of said diode.

2. A tachometer circuit as claimed in claim 1 wherein said load resistor is of such value as to cause saturation of said transformer at about one-third of the value of the maximum current flowing in the primary winding of said transformer.

3. A tachometer circuit as claimed in claim 2 wherein the ratio of secondary to primary turns of said input transformer is within the range of 100:1 to 500:1.

4. A tachometer circuit as claimed in claim 1 with additionally,
   a second diode having one electrode thereof connected to the collector of said transistor, said capacitor being connected between the base of said transistor and the other electrode of said second diode; and
   a third diode connected from the junction of said capacitor and second diode to the junction of said meter and first diode.

5. A tachometer circuit as claimed in claim 4 wherein said load resistor is of such value as to cause saturation of said transformer at about one-third of the value of the maximum current flowing in the primary winding of said transformer.

6. A tachometer circuit as claimed in claim 5 wherein the ratio of secondary to primary turns of said input transformer is within the range of 100:1 to 500:1.

References Cited

UNITED STATES PATENTS

| | | | |
|---|---|---|---|
| 2,773,238 | 12/1956 | Petroff | 324—70 |
| 2,934,703 | 4/1960 | Cohen | 324—70 |
| 3,053,243 | 9/1962 | Domann | 324—70 |
| 3,233,175 | 2/1966 | Faria | 324—70 |
| 3,268,810 | 8/1966 | Reiner | 324—70 |

RUDOLPH V. ROLINEC, *Primary Examiner.*

M. LYNCH, *Assistant Examiner.*